(12) United States Patent  
Thompson et al.

(10) Patent No.: US 8,351,338 B2
(45) Date of Patent: Jan. 8, 2013

(54) SHARING SINGLE TESTER AMONG PLURALITY OF ACTIVE COMMUNICATION LINKS

(75) Inventors: William Joseph Thompson, Devon, PA (US); Ernest E. Bergmann, Fountain Hill, PA (US); Bill (Xunxie) Wang, Audubon, PA (US)

(73) Assignee: JDS Uniphase Corporation, Milpitas, CA (US)

( * ) Notice: Subject to any disclaimer, the term of this patent is extended or adjusted under 35 U.S.C. 154(b) by 368 days.

(21) Appl. No.: 12/729,134

(22) Filed: Mar. 22, 2010

(65) Prior Publication Data

US 2010/0241906 A1    Sep. 23, 2010

Related U.S. Application Data

(60) Provisional application No. 61/162,440, filed on Mar. 23, 2009.

(51) Int. Cl.
    *H04J 1/16* (2006.01)
(52) U.S. Cl. ........................................ 370/247; 714/719
(58) Field of Classification Search .................. 370/201, 370/241–253; 714/711, 715, 716, 717, 719
    See application file for complete search history.

(56) References Cited

U.S. PATENT DOCUMENTS

| 5,010,542 A | 4/1991 | Pfaff ................................. 385/17 |
| 5,521,734 A | 5/1996 | Frigo ............................. 398/139 |
| 5,524,154 A | 6/1996 | Bergland et al. ................. 385/17 |
| 5,548,399 A | 8/1996 | Takai et al. .................... 356/218 |
| 5,568,575 A | 10/1996 | Sato ................................ 385/16 |
| 5,751,868 A | 5/1998 | Bala et al. ........................ 385/16 |
| 6,519,230 B1 * | 2/2003 | Murayama .................... 370/250 |
| 6,590,644 B1 | 7/2003 | Coin et al. ..................... 356/218 |
| 6,873,630 B1 | 3/2005 | Muller et al. .................. 370/356 |
| 7,110,633 B1 | 9/2006 | Helkey et al. ................... 385/16 |
| 7,191,371 B2 * | 3/2007 | Hsu et al. ....................... 714/717 |
| 7,474,851 B2 | 1/2009 | Inman et al. .................... 398/22 |
| 2006/0146318 A1 | 7/2006 | Adam et al. ............... 356/237.1 |
| 2008/0123550 A1 * | 5/2008 | Pitis .............................. 370/253 |
| 2009/0138761 A1 * | 5/2009 | Moreira ......................... 714/32 |
| 2011/0164524 A1 * | 7/2011 | Kawamoto et al. ........... 370/252 |

* cited by examiner

*Primary Examiner* — Ricky Ngo
*Assistant Examiner* — Kan Yuen
(74) *Attorney, Agent, or Firm* — Matthew A. Pequignot; Pequignot + Myers LLC

(57) ABSTRACT

A test system for testing a communication system having a plurality of communication links is disclosed. The test system has a single tester for performing various measurement and diagnostic tasks on a single link. The test system also has a switching system for independently testing any link by coupling the tester into any one link. The tester is coupled into the link by coupling the tester input to the link's transmitter and the tester output to the link's receiver. The switching system couples the tester such that all remaining links of the communication system have a unique one of the plurality of transmitters coupled to a unique one of the plurality of receivers, whereby the operation of the communication system can be maintained while testing individual links.

24 Claims, 16 Drawing Sheets

800b

800c

SHARING SINGLE TESTER AMONG PLURALITY OF ACTIVE COMMUNICATION LINKS

CROSS-REFERENCE TO RELATED APPLICATIONS

The present invention claims priority from U.S. provisional patent application No. 61/162,440, filed Mar. 23, 2009, which is incorporated herein by reference.

TECHNICAL FIELD

The present invention relates to communication test equipment, and in particular to test systems for testing communication systems having a plurality of links operating in parallel.

BACKGROUND OF THE INVENTION

Communication systems frequently have multiple communication links operating in parallel to increase the speed of transmission, and/or to simplify the construction of an individual link. By way of example, U.S. Pat. No. 6,873,630 incorporated herein by reference, issued Mar. 29, 2005 to Muller et al., discloses an Ethernet transmission system architecture that distributes individual Ethernet frames across a plurality of logical channels running in parallel at much lower data rates. Each channel may be conveyed by a separate conductor, or the channels may be carried through a shared medium using a form of multiplexing. The conductors may be electric or fiberoptic cables.

An emerging IEEE 802.3ba standard "40 Gb/s and 100 Gb/s Ethernet", which is incorporated herein by reference, involves a data transmission at a very high rate using parallel operation of many individual lower data rate links. The parallel operation of the individual links provides the specified data rate. The IEEE 802.3ba standard has many variants. Some of the IEEE 802.3ba variants specify electrical cabling equipment to be used to support the lower data rate links, while others specify fiber optics equipment to be used to support the lower data rate links.

The emerging IEEE 802.3ba standard defines many requirements, as well as tests to confirm that the requirements are met. Some of the requirements are specifications on the transmitters, such as output voltage or power levels. In the case of fiber optics, the transmitters must operate within a certain wavelength range. Because the transmitters are often placed in close proximity to each other and to receivers, there are tests needed to confirm that they do not suffer from excessive cross-talk from each other's simultaneous operation. Other requirements relate to the receivers, which must satisfy sensitivity requirements and overload performance requirements. Still other requirements relate to the system functioning in the presence of varying relative delay of transmission among the links. This varying relative delay is called herein "skew".

Referring to FIG. 1a, a prior-art communication link 104 comprises a transmitter (TX) 10, a transmission medium 20 shown as a line with an arrow head, and a receiver (RX) 30. The transmitter 10 transmits a signal into the transmission medium 20 that leads to the receiver 30. The transmitter 10 may be transmitting a digital data stream or an analog signal.

Referring to FIG. 1b, an insertion point 40 along the transmission medium 20 is illustrated. The transmission medium 20 between the transmitter 10 and the point 40 has a portion 20a and a portion 20b. The choice of the insertion point 40 depends upon testing requirements. For example, when the transmitter 10 is tested, the point 40 is located proximate to the transmitter 10. When a signal propagated through the link 20 is to be characterized, the insertion point 40 is located proximate to the receiver 30.

Turning to FIG. 1c, a diagnostic apparatus 100 is shown. The diagnostic apparatus 100 is connected at the insertion point 40. For an analog link the diagnostic apparatus 100 can be used to gauge the output of the transmitter 10, recording the content arriving from the transmitter 10, or some other feature arriving along the portion 20a of the transmission medium 20. Also for analog links, the diagnostic apparatus 100 can be used to inject noise or a test signal into the portion 20b of the transmission medium 20, to be carried toward the receiver 30.

For a digital link, similar diagnostic activity could be carried out. The diagnostic apparatus 100 can monitor the output power, jitter, and noise of a signal transmitted by the transmitter 10. Alternatively or simultaneously, the diagnostic apparatus 100 can look for deficiencies in the transmission medium 20a and monitor the test signal. The diagnostic apparatus 100 can modify the test signal by delaying it, by jittering it, by inserting errors into it, by replacing the digital content, by attenuating, by amplifying the signal, or by "stressing" the signal in some other manner. The diagnostic apparatus 100 is normally expected to report aspects of the transmitter 10 and of the transmission medium 20. The results of "stressing" activity are typically reported at the receiver 30 or at some later point in the system being diagnosed.

To provide diagnostics to test or verify all these requirements for all of the links simultaneously is resource intensive and expensive. Consequently, there is a need to reduce the costs by sharing one set of diagnostic equipment among several active communication links. It is essential to be able to perform such characterization without disrupting operation of other communication links of the system being tested.

SUMMARY OF THE INVENTION

According to the invention, a test system is provided for testing a communication system comprising a plurality of links. The test system includes a tester and a switching system for switching the tester from link to link. In one embodiment, the switching system construction is simplified by taking into account that it is not always essential to keep unique association between transmitters and receivers in the communication system. Rather, the link can be identified by signals embedded into the data being transmitted through the link itself. Advantageously, it allows for a considerable reduction of switching system complexity. In another embodiment, the unique association between transmitters and receivers is preserved upon switching, while the switching system construction is nonetheless simplified.

Depending upon the medium used for the links, suitable switches can be used to effectively reallocate the diagnostic/testing equipment among several active communications links. For example, if the medium used for the links are coaxial cable, the switches are coaxial switches. Similarly, if the links utilize multimode optical fiber, the switches are multimode optical switches. It is important that the switches provide connectivity for the other links that need to operate concurrently.

Throughout the specification, the terms "diagnostic equipment", "diagnostic", "tester", "testing equipment", "tester apparatus", and the like, are used interchangeably. They refer to any equipment usable for diagnostics of the communication system operation, as well as for generic testing of performance of the system and/or individual system components or modules.

In accordance with the invention there is provided a test system for testing a communication system comprising a plurality of transmitters and receivers coupled in pairs forming a plurality of links, each of the plurality of links having a unique one of the plurality of transmitters coupled to a unique one of the plurality of receivers, the test system comprising:

a single tester having an input and an output, for independently testing any link of the plurality of links upon coupling the tester into the link by coupling the tester input to the link's transmitter and the tester output to the link's receiver; and a switching system for coupling the tester into any of the plurality of links such that all remaining links of the communication system have a unique one of the plurality of transmitters coupled to a unique one of the plurality of receivers.

In accordance with another aspect of the invention there is provided a test system for testing of a communication system having N links with N transmitters and N receivers. In this test system, the switching system comprises a barrel selector switch having N+1 inputs and N+1 outputs, wherein the N transmitters are coupled to N of the N+1 inputs of the barrel selector switch, one transmitter per one input, wherein the N receivers are coupled to N of the N+1 outputs of the barrel selector switch, one receiver per one output, and wherein the tester is coupled to the (N+1)th input and the (N+1)th output, whereby the tester can be coupled into to any one of the N links.

Alternatively, the switching system can include N 2×2 switches, wherein each of the N transmitters is coupled to a unique one of the N receivers through a unique one of the N 2×2 switches; wherein the N 2×2 switches are connected in a daisy chain having two ends; and wherein the tester is coupled to the ends of the daisy chain, whereby the tester can be coupled into any one of the N links.

Instead of connecting the 2×2 switches into a daisy chain, they can be connected to a common 1:N element such as a 1:N splitter or switch, and to a common N:1 element such as a N:1 combiner or switch.

In another embodiment of the invention, removable diagnostic switch fabric (RDSF) elements are used in place of the 2×2 switches. The RDSF elements are similar in construction to 2×2 switches, having more inputs and more outputs than 2×2 switches. Using the RDSF elements allows for a higher link count in a communication system being tested. The RDSF elements can be combined into a daisy chain as well, in which case the 1:N and N:1 elements are not required.

The tester of the test system can include a noise source for adding noise to the signal, and/or an inter-symbol interference or jitter generator, for adding inter-symbol interference and/or jitter to the outgoing signal, for testing and diagnostic purposes.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1A:
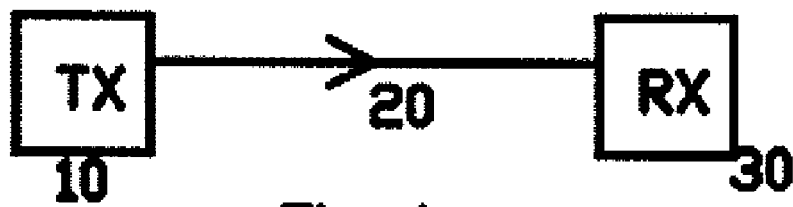
FIGS. 1a to 1c are block diagrams of a prior-art test equipment connection.
Figure 1B:
Figure 1C:
Figure 2:
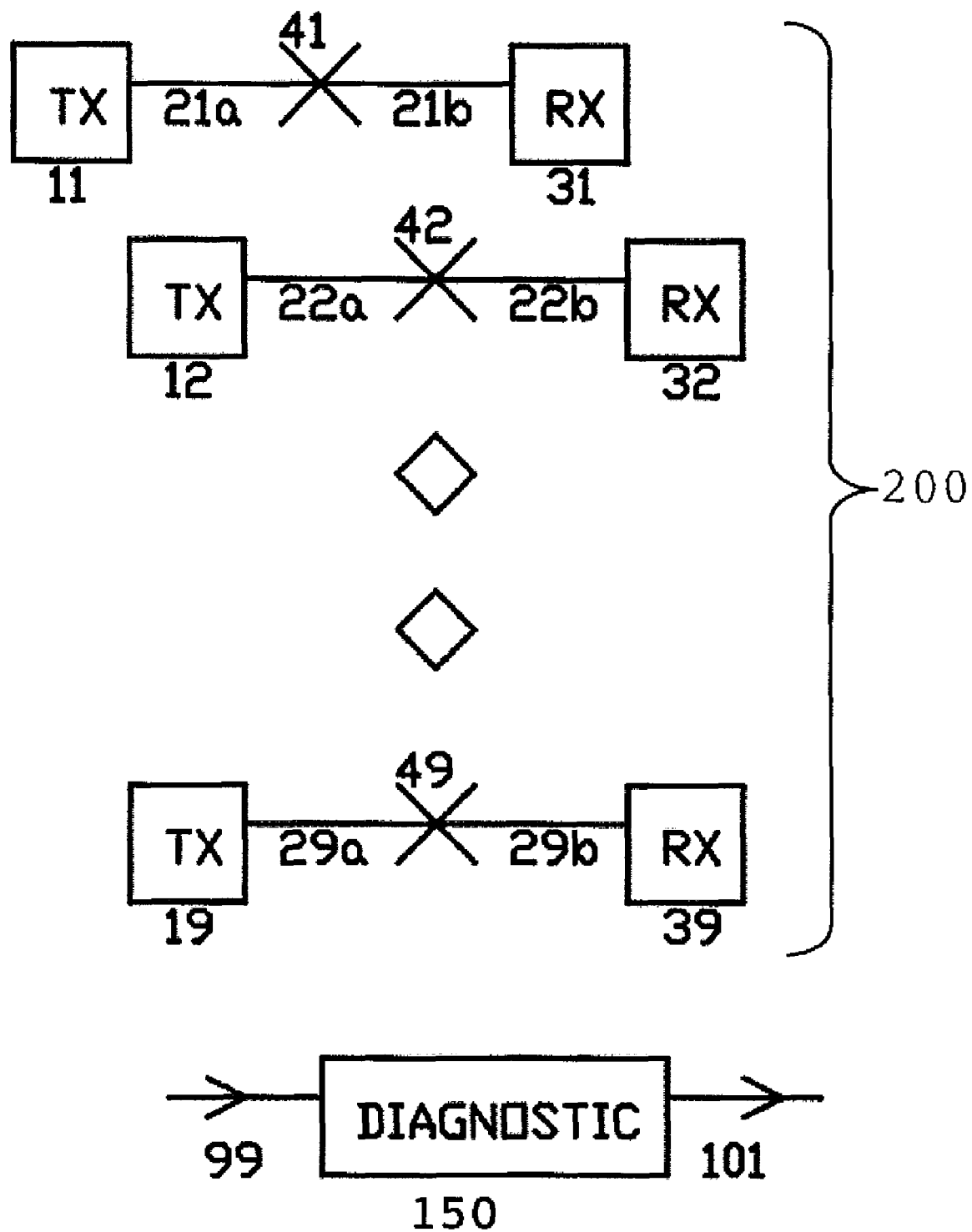
FIGS. 2 and 3 are block diagrams of a tester connection according to the invention.

Referring now to FIG. 2, a block diagram of a communication system 200 is shown. The communication system 200 has a plurality of transmitters 11, 12, . . . , 19 and receivers 31, 32, . . . , 39 coupled in pairs through portions 21a-21b, 22a-22b, . . . , 29a-29b of a communication medium such as a cable. The transmitters 11 . . . 19, the receivers 31 . . . 39, and the portions of a communication medium 21a-21b . . . 29a-29b form a plurality of communication links. Each of the plurality of communication links has a unique one of the plurality of transmitters 11 . . . 19 coupled to a unique one of the plurality of receivers 31 . . . 39, respectively.

The communication links containing transmitters 11 to 19 and receivers 31 to 39, respectively, can be diagnosed at a respective plurality of N insertion points 41 to 49. The communication links can be serial links or parallel links carrying low data rate signals. A high data rate signal is split into a plurality of low data rate signals for transmission through the individual links, and then combined into a higher data rate signal upon reaching its destination. The number of these similar links, N, is at least 2. In the interests of saving resources and maintaining consistency of measurement, only one tester 150 is used to test the N links.

The tester 150 can monitor the output power, jitter, and noise of a signal transmitted by the transmitter 10. Alternatively or simultaneously, the tester 150 can look for deficiencies in the transmission medium 20a and monitor the test signal. The tester 150 can modify the test signal by delaying it, by jittering it, by inserting errors into it, by replacing the digital content, by attenuating, by amplifying the signal, and/or by "stressing" the signal in some other manner. The tester 150 is normally expected to report aspects of the transmitter 10 and of the transmission medium 20. The results of "stressing" activity are typically reported at the receiver 30 or at some later point in the system being diagnosed.

The tester 150 has an input 99 and an output 101. An object of the present invention is to be able to effect the insertion of the tester 150 successively into each of the active links at the N insertion points 41 to 49 while maintaining activity in all of the other links. A link that is transmitting from its transmitter 11 to 19, to its receiver 31 to 39 is said to be "active" and such links are "active links". The insertion is to be performed such that all remaining links of the communication system 200 have a unique one of the plurality of transmitters 11 to 19 coupled to a unique one of the plurality of receivers 31 to 39. For certain systems, such as those described by IEEE 802.3ba, it is not important which transmitters are linked to which receivers, as long as a total of N active links is formed.

Figure 3:
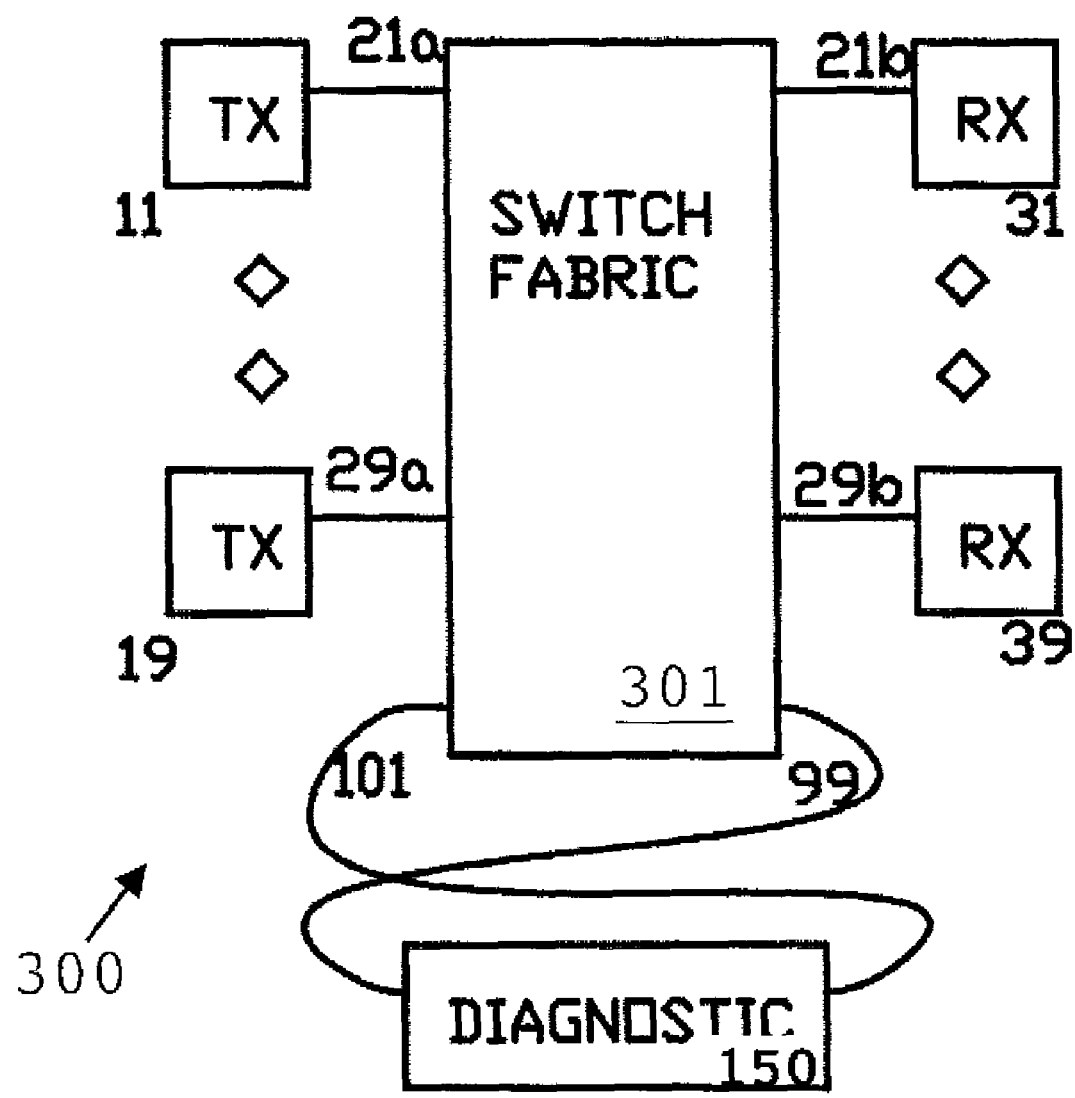

Turning to FIG. 3, an embodiment of a test system 300 of present invention is shown. There are N links composed of the transmitters 11 to 19 having the respective outputs connected to the portions 21a to 29a of the transmission medium, and the respective receivers 31 to 39 having the respective inputs connected to the portions 21b to 29b of the transmission medium. A switch fabric 301 in its "basic state" connects the transmitter outputs at 21a to 29a with the receiver inputs at 21b to 29b, respectively. For purposes of exposition, the concept of "switch fabric" or "switching system" will include a single switch, as well as a combination of several or even many discrete switches as disclosed further below.

The switch fabric 301 can connect the output 101 of the tester 150 to the input 99 thereof, thereby connecting the output 101 of the tester 150 to its own input 99. When the tester 150 is connected to itself in this manner, it is said to be in a "loop-back" configuration. In many situations, the tester 150 has a receiver at its input 99 and a transmitter at its output 101. The loop-back configuration enables the tester 150 to perform a number of operational tests on itself. For example, it can verify that its transmitter and its receiver are all operational, by sending some data to itself, that is, from the transmitter to the receiver via the input 99 and the output 101. Furthermore, when the tester 150 is connected to itself, it is not connected to any link and therefore it can be removed from the test system without impacting the functioning of the communication system.

With the loop-back capability, more sophisticated testing apparatus and measurements can ascertain if the diagnostic 150, along with the connection through the switch fabric 301, is working the same as when it was initially calibrated. A self-testing apparatus in a loop-back configuration is disclosed in U.S. patent application Ser. No. 11/030,381 published as 2006/0146318, which is incorporated herein by reference.

The switch fabric 301 is preferably controlled by a computer, and is generally made of several smaller switches. The computer controller can automatically test each link in sequence at predetermined time periods or whenever the output signal does not provide a predetermined quality of service (QOS). Alternatively, the computer can be directed by outside operator control to test all or individual links, if so desired. One embodiment of the invention ensures that any particular input from among the transmitter outputs 21a to 29a can be connected to the input 99, and that the output 101 can be connected to any particular output from among the receiver inputs 21b to 29b. For many applications, the selections of input and output must be coordinated, namely when the output 21a of the transmitter 11 is not connected to the corresponding input 21b of the receiver 31, but is connected instead to the input 99 of the tester 150, then the output 101 of the tester 150 is connected specifically to the input 21b of the receiver 31. For other applications, such as many of those described by IEEE 802.3ba, the matching of transmitters to receivers is not a concern, as long as all N links remain active.

Figure 4A:
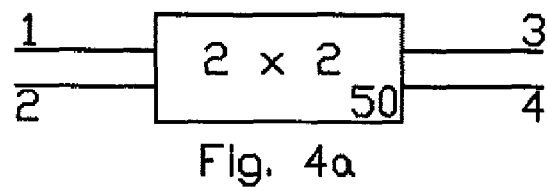
FIGS. 4a to 4c are block diagrams of a 2×2 switch usable with the invention.
Figure 4B:
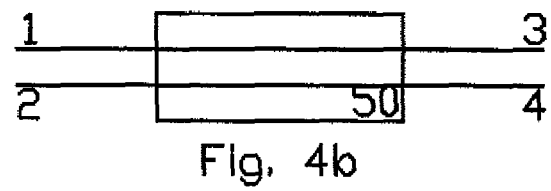
Figure 4C:
Figure 4D:
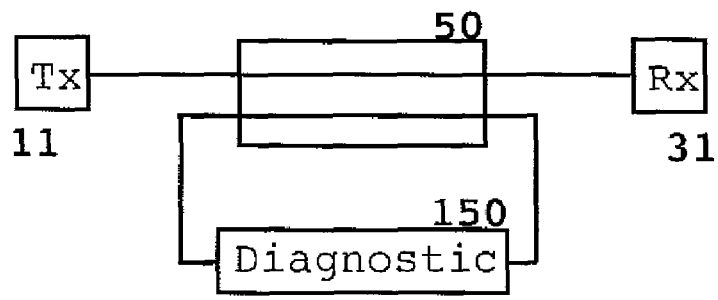
FIGS. 4d and 4e are block diagrams illustrating use of the 2×2 switch of FIGS. 4a to 4c for coupling a tester into a transmission link.
Figure 4E:
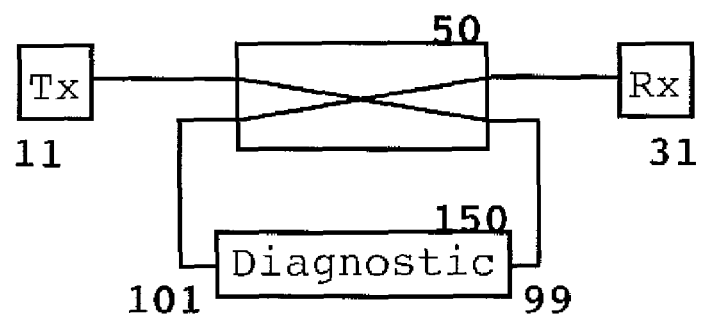

Turning to FIGS. 4a to 4e, the operation of 2×2 switches 50 is illustrated by means of block diagrams. The 2×2 switches 50 are an important component in many switch fabrics, such as the switch fabric 301. In FIGS. 4a to 4c, the two inputs to the 2×2 switch 50 are labeled 1 and 2. Accordingly, the two outputs are labeled 3 and 4. FIG. 4a indicates how this type of the 2×2 switch 50 will be indicated elsewhere, namely as a rectangle with 2 inputs on the left and two outputs on the right and the designation "2×2" on the rectangle. The 2×2 switch 50 can only be in two states: the "bar" state, illustrated in FIG. 4b, and the "cross" state illustrated in FIG. 4c. These two states, "bar" and "cross", are a simple way of describing connections shown. In FIG. 4d, the 2×2 switch 50 is in the "bar" state, connecting the transmitter 11 directly to the receiver 31, while connecting the tester 150 to itself, for self-testing purposes, as noted above. In FIG. 4e, the 2×2 switch 50 is in the "cross" state, connecting the transmitter 11 to the input 99 of the tester 150, while connecting the output 101 of the tester 150 to the receiver 31. Thus, the 2×2 switch 50 can be used to switch the tester 150 in and out of the transmission link having the transmitter 11 and the receiver 31.

Figure 4F:
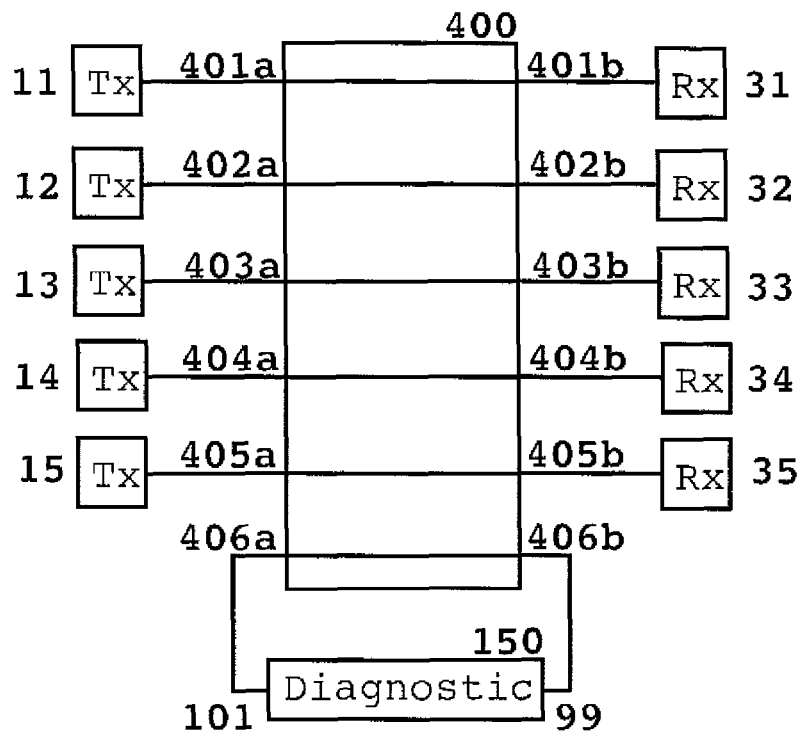
FIGS. 4f and 4g are block diagrams illustrating use of a barrel selector switch for coupling the tester into a transmission link.
Figure 4G:
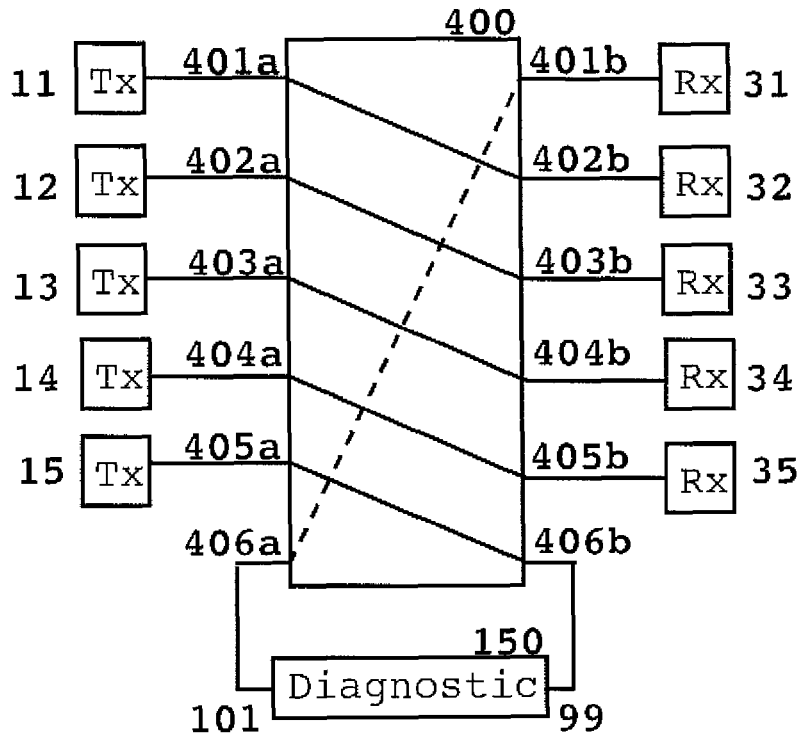

Referring to FIGS. 4f and 4g, a barrel selector switch 400 is illustrated. The barrel selector switch 400 is a particular embodiment of the switch fabric 301 of FIG. 3. The barrel selector switch 400 has inputs 401a to 406a and outputs 401b to 406b. The barrel selector switch 400 has 6 switch states. In the first state shown in FIG. 4f, the input 401a is connected to the output 401b, input 402a is connected to the output 402b, and so on. In the second state shown in FIG. 4g, the input 401a is connected to the output 402b, input 402a is connected to the output 403b, and so on, input 406a being connected back to the output 401b. In the third state, not illustrated, the input 401a is connected to the output 403b, and so on. One might think of the barrel selector switch as of a barrel having its upper half rotatable relative to the lower half, the inputs being equidistantly distributed along the circumference of the upper half and the outputs being equidistantly distributed along the circumference of the lower. When the barrel switch is switched from the position shown in FIG. 4f to the position shown in FIG. 4g, the tester 150 is coupled into a link containing the transmitter 15 and the receiver 31. In other positions of the barrel selector switch 400, the tester 150 is coupled into links containing the transmitters 11 to 14 and the receivers 32 to 35, respectively. The tester 150 can be used to test these transmitters and receivers, such that all remaining links have a unique one of the transmitters 11 to 15 coupled to a unique one of the receivers 31 to 35. The barrel selector switch 400 has a limitation that in different positions of the switch different transmitters are coupled to different receivers, which may be unacceptable for some communication systems as noted above.

In general, the barrel selector switch 400 can have N+1 inputs and N+1 outputs to switch the tester 150 between N links of a communication system, i.e. the barrel selector switch 400 has one more input and output than the system has links to accommodate the tester 150. The test system in this case will have the N transmitters coupled to N of the N+1 inputs of the barrel selector switch 400, one transmitter per one input. The N receivers will be coupled to N of the N+1 outputs of the barrel selector switch, one receiver per one output. The tester 150 will be coupled to the (N+1)th input and the (N+1)th output. By switching the barrel selector switch 400 between its N states, the tester 150 can be coupled into to any one of the N links of the transmission system.

Figure 5A:
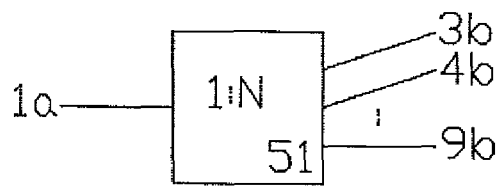
FIGS. 5a and 5c are block diagrams of 1:N switches.
Figure 5B:
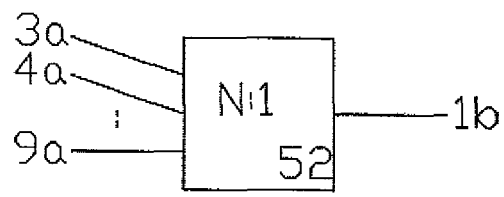
FIGS. 5b and 5d are block diagrams of N:1 switches usable with the invention.

Referring to FIGS. 5a to 5d, block diagrams of 1:N and N:1 switches are shown. In FIG. 5a, a 1:N switch 51 selects a single output from among the plurality or N outputs 3b to 9b to connect an input 1a to. All of the outputs that are not connected to the input 1a are generally not connected to anything by the switch 51. FIG. 5b illustrates an N:1 switch 52, which might be constructed in the same way as the switch 51 of FIG. 5a, except that the input and output functions are interchanged. For each of the N ways that the switch 52 is set, only one of plurality or N inputs 3a to 9a is connected to one output 1b. Of course, N can be any integer number $\geq 2$.

Figure 5C:
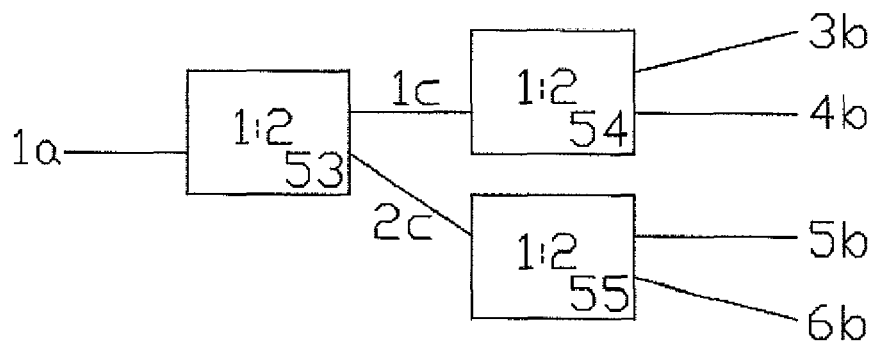

Among 1:N switches, a 1:2 switch may be particularly easy to construct. It may be particularly easy to control as it has only two states that may be electronically specified, for example as powered and unpowered states. FIG. 5c shows by the way of example that even if only 1:2 switches are used, a 1:4 switch can be constructed by interconnecting three 1:2 switches 53, 54, and 55 at 1c, 2c. It should be obvious that by using more than 3 1:2 switches one can make 1:N switches, where N is larger than 4.

Figure 5D:
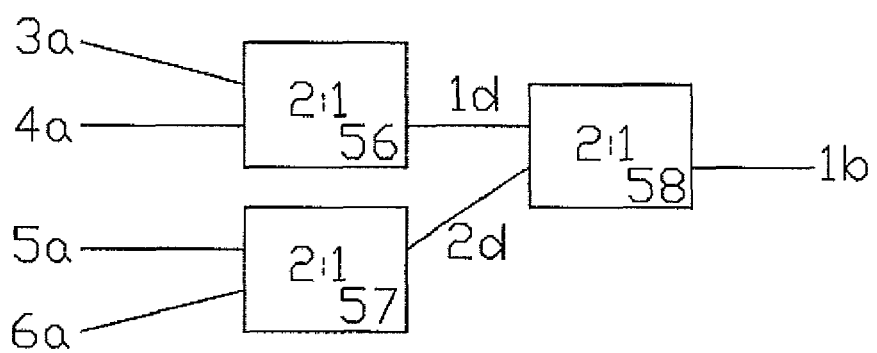

Turning to FIG. 5d, a N:1 switch is shown. The N:1 switch of FIG. 5d is constructed in the same manner as the 1:N switch of FIG. 5c, by connecting three 1:2 switches 56, 57, and 58 at 1d, 2d.

Figure 6:
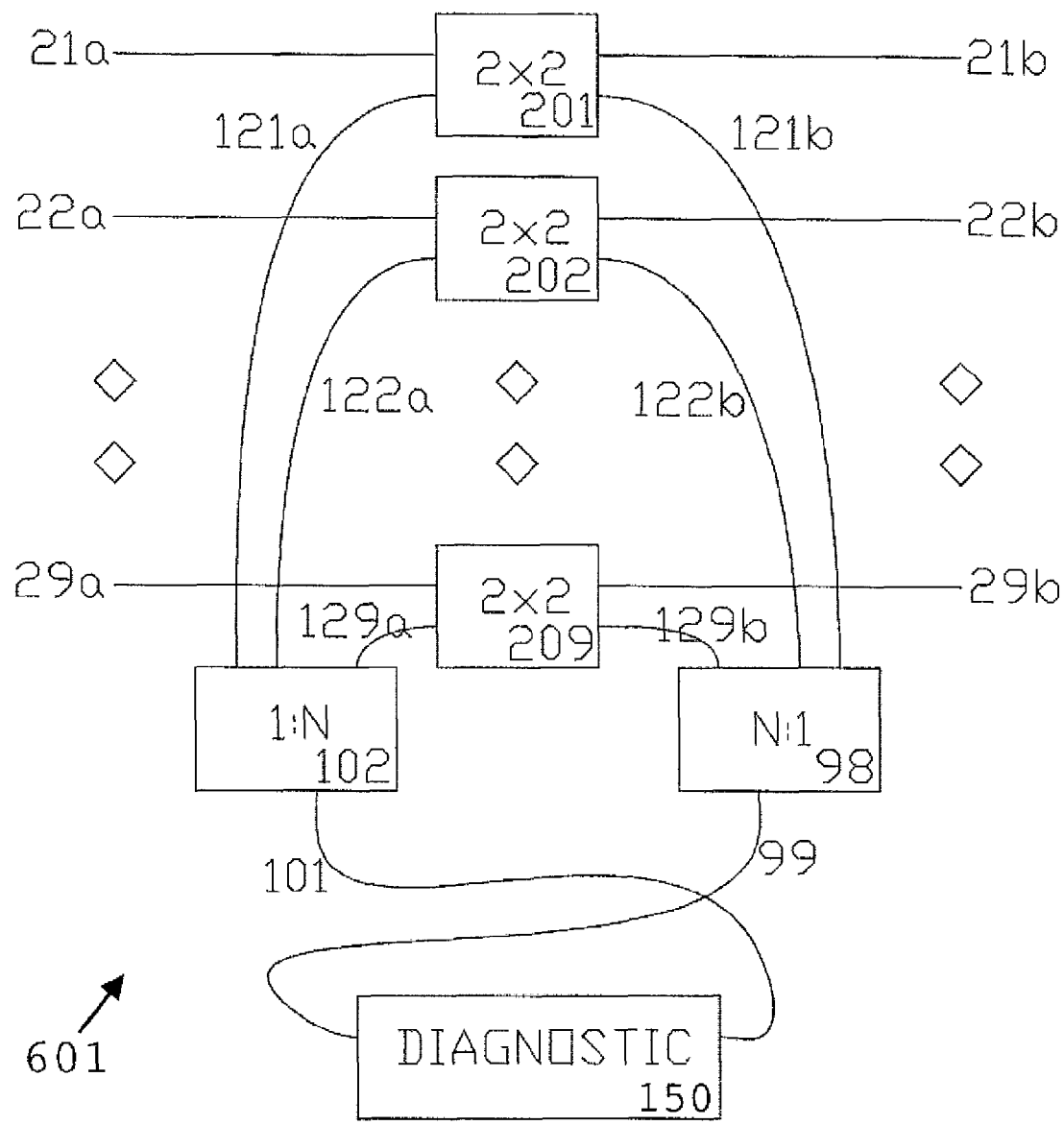
FIG. 6 is a block diagram of a switching system of the invention comprised of 2×2 switches of FIGS. 4a to 4c, a 1:N switch of FIGS. 5a and 5c, and a N:1 switch of FIGS. 5b and 5d.

Referring now to FIG. 6, one class of embodiments of a switching system 601 of the present invention is shown. The switching system 601 has the N, e.g. nine, inputs 21a to 29a along with the N, e.g. nine, outputs 21b to 29b connected to transmitters 11 to 19 and receivers 31 to 39 as indicated in FIGS. 2 and 3. The switching system 601 has N 2×2 switches 201 to 209, a 1:N switch 102 with one input and N outputs, and an N:1 switch 98 with N inputs and one output. Each of the N transmitters 11 to 19 (not shown in FIG. 6) is coupled to a unique one of the N receivers 31 to 39 (not shown in FIG. 6) through a unique one of the N 2×2 switches 201 to 209. Each of the N outputs of the 1:N switch 102 is coupled to a unique one of the N 2×2 switches 201 to 209. Each of the N inputs of the N:1 switch 98 is coupled to a unique one of the N 2×2 switches 201 to 209. The tester 150 is coupled to the input of the 1:N switch 102 and to the output of the N:1 switch 98.

To have N simultaneously active links, the N 2×2 switches 201 to 209 are all set to their "bar" states. The tester 150 can be coupled into any of the active links. For example, if the tester 150 is to be coupled into a path between the transmitter output 22a and receiver input 22b, then the 2×2 switch 202 is set to its "cross" state. The "cross" state sets up a connection from the transmitter output 22a to an output 122b of the switch 202, and from an input 122a of the switch 202 to the receiver input 22b. The 1:N switch 102 is also set to connect the output 101 of the tester 150 to the input 122a of the switch 202, and to set the N:1 switch 98 to connect the output 122b to the input 99 of the tester 150. Thus, the tester 150 is coupled into a path between the transmitter output 22a and the receiver input 22b, as desired.

In a similar manner one can interpose the tester 150 instead into any of the other N active links by selecting the corresponding 2×2 switch 201 to 209 to be in its "cross" state and routing the 1:N switch 102 and the N:1 switch 98 to connect between that 2×2 switch and the tester input 99 and tester output 101. This embodiment does provide loop-back capability, in that the output 101 can be connected to the input 99, in quite a few ways. The 1:N and the N:1 switches 102 and 98 have to set to connect the output 101 and the input 99 to the same 2×2 switch. There are N such choices that will work. If that 2×2 switch is in the "bar" state, it does not interrupt the link it is in, and it also completes the loop-back connection for the tester 150. This is similar to the operation of the 2×2 switch 50 illustrated in FIGS. 4d and 4e.

The 1:N switch 102 can be replaced by a 1:N coupler, or the N:1 switch 98 can be replaced with a N:1 coupler. However, both 1:N and N:1 elements cannot be both couplers. When they are both couplers, multipath interference will result. In practice, however, point-to-point high-speed communications systems rarely use passive splitting and/or combining.

In the switching system 601 of FIG. 6, the association between the transmitter outputs 21a-29a and the receiver inputs 21b-29b cannot be changed, regardless of which transmission link is connected to the tester 150. For some testing purposes and especially for troubleshooting purposes, changing transmitters for any given receiver, or changing receivers for any given transmitter may be very beneficial. To have this functionality, a "non-loss" input and/or an output selector can be used. The selector is similar in its function to a N:1 or 1:N switch, with one important difference. While N:1 or 1:N switch simply disconnects the N−1 non-selected inputs or outputs, the "non-loss" selector keeps the non-selected ports connected to some transmitter and/or receiver, thereby fulfilling the condition of always having N operational links during testing. Particularly advantageous non-loss input and output selector arrangements according to the present invention are described in detail below.

Figure 7A:
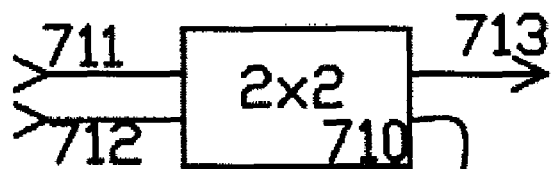
FIGS. 7a to 7c are block diagrams of 2-input, of 3-input, and of 4-input non-loss input selector switches, respectively.
Figure 7B:
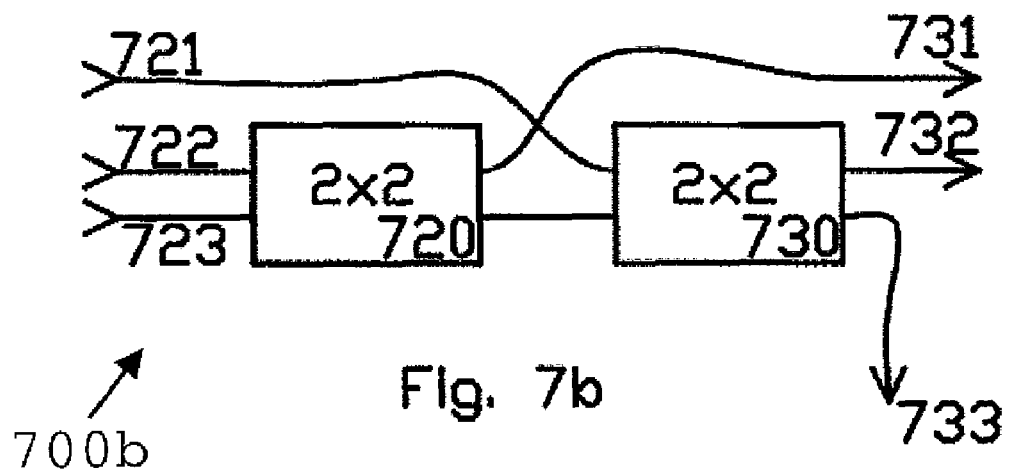
Figure 7C:
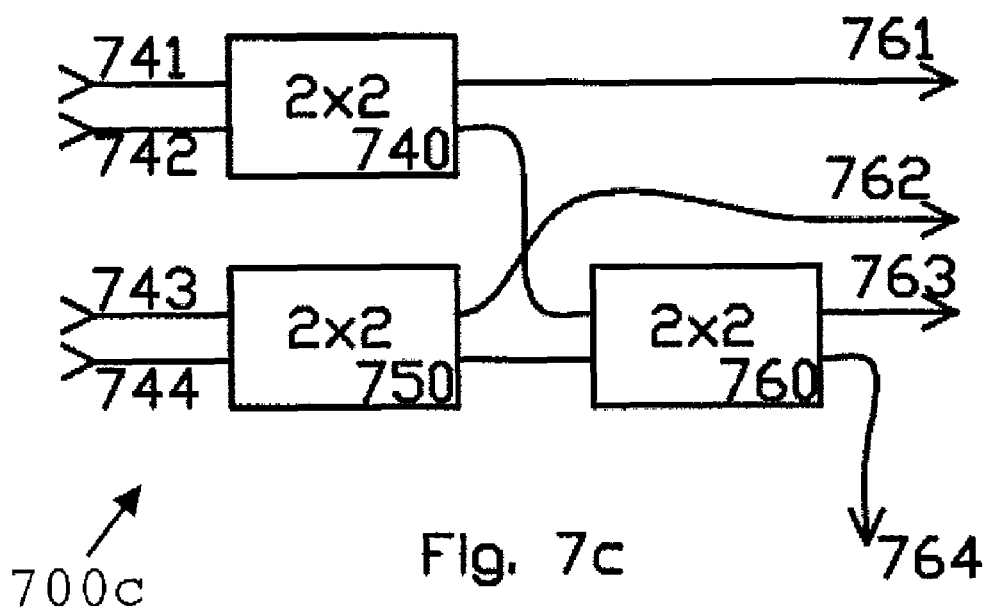

Turning to FIGS. 7a to 7c, implementations of 2-input, of 3-input, and of 4-input non-loss input selectors are shown, respectively. The term, non-loss, means that regardless of the state of the selector, any input is always connected to an output. Thus, in a non-loss selector, the number of inputs N always equals the number of outputs.

Referring to FIG. 7a, a 2×2 switch 710 has two inputs 711 and 712 and two outputs 713 and 714. The output 714 is of particular interest, as indicated by an arrow pointing down the page. It can be connected in turn to any of the inputs 711 or 712. The output 714 can be connected to the input 711 by placing the 2×2 switch 710 in its "cross" state. Alternatively, the output 714 can be connected to the input 712 by placing the 2×2 switch 710 in its "bar" state. Thus, the 2×2 switch 710 functions as a 2×2 non-loss input selector.

Referring to FIG. 7b, two 2×2 switches 720 and 730 are coupled to produce a non-loss 3-input selector 700b. The 3-input selector 700b has 3 inputs 721, 722, and 723, and three outputs 731, 732, and 733. The output 733 is singled out, by pointing down the page, to be the particular output that can be connected in turn to each of the three inputs 721, 722 or 723. The input 721 is connected to the output 733 by putting the 2×2 switch 730 into its "cross" state. The state of the switch 720 in this case will not change that the input 721 is connected to the output 733, but the other two connections are affected. The input 722 is connected to the output 731, and the input 723 is connected to the output 732 when the switch 720 is in its "bar" state. When the switch 720 is in its "cross" state, the input 722 is connected to the output 733 through switch 730, and the input 723 is connected to the output 731. Now, to connect the input 722 to output 733, the switch 720 is set in its "cross" state, and the switch 730 in its "bar" state. Finally, to have the input 723 connected to the output 733, both switches 720 and 730 are set in their "bar" states.

Referring now to FIG. 7c, three 2×2 switches 740, 750, and 760 are configured to produce a 4-input non-loss input selector 700c. The 4-input selector 700c has four inputs 741, 742, 743, and 744, and four outputs 761, 762, 763, and 764. The output 764 is singled out by showing pointing down the page. The output 764 can be connected in turn to each of the four inputs 741, 742, 743, and 744. To connect the input 741 to the output 764, the switch 740 is set to the "cross" state, and the switch 760 is set to the "cross" state. To connect the input 742 to the output 764, the switch 740 is set to the "bar" state and the switch 760 is set to the "cross" state. To connect the input 743 to the output 764, the switch 750 is set to the "cross" state, and the switch 760 is set to the "bar" state. Lastly, to connect the input 744 to the output 764, both switches 750 and 760 are set to their "bar" states.

Figure 8A:
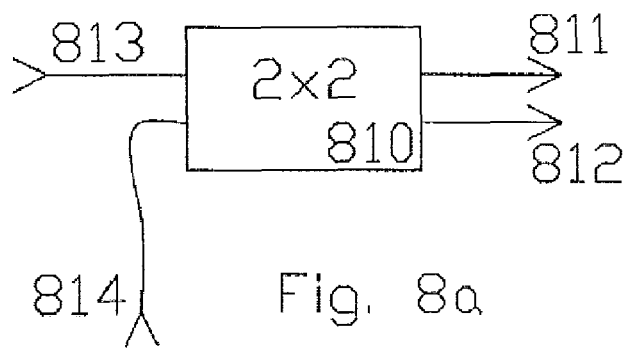
FIGS. 8a to 8c are block diagrams of 2-output, of 3-output, and of 4-output non-loss output selector switches, respectively.
Figure 8B:
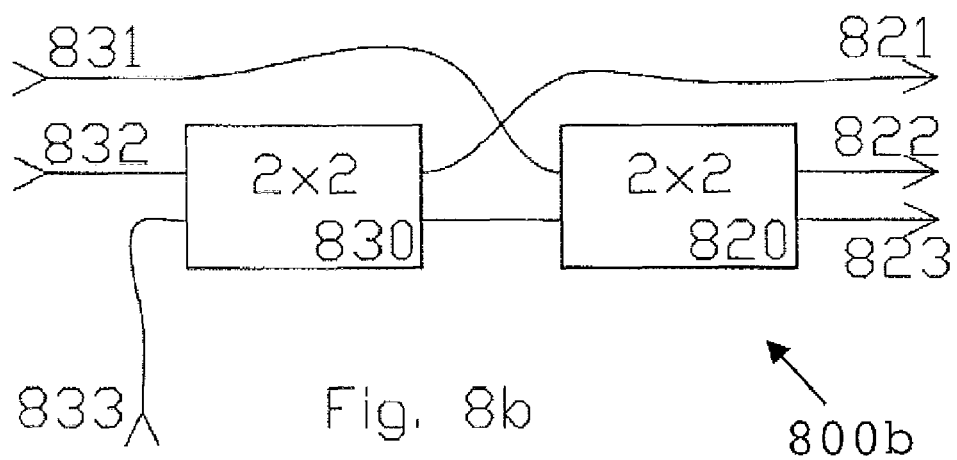
Figure 8C:
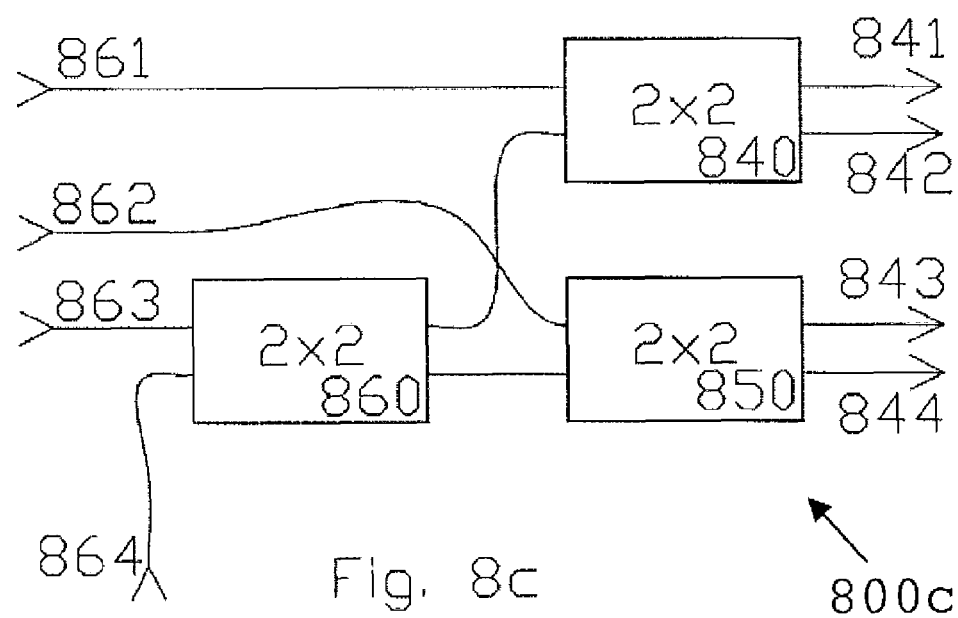

Turning to FIGS. 8a to 8c, implementations of 2-output, of 3-output, and of 4-output non-loss output selector are shown at 810, 800b, and 800c, respectively. The selectors 810, 800b, and 800c minor the selectors 710, 700b, and 700c of FIGS. 7a to 7c, respectively. To aid in viewing the correspondences, the numbering in FIGS. 8a to 8c show corresponding parts 100 higher. For example, the switch 750 in FIG. 7c corresponds to a switch 850 in FIG. 8c. Also, for example, the output 733 in FIG. 7b corresponds to an input 833 of FIG. 8b. All inputs of FIGS. 7a to 7c correspond to outputs in FIGS. 8a to 8c, respectively. Also, all outputs of FIGS. 7a to 7c correspond to inputs in FIGS. 8a to 8c, respectively. Without going into details again, one can see that FIGS. 8a to 8c are again selectors, but for inputs instead of for outputs.

It is not necessary to use 2×2 switches to make non-loss output or input selectors. A second approach would be to use barrel selector switches that connect N inputs to N outputs, for example the barrel selector switch 400 of FIGS. 4f and 4g.

Figure 9A:
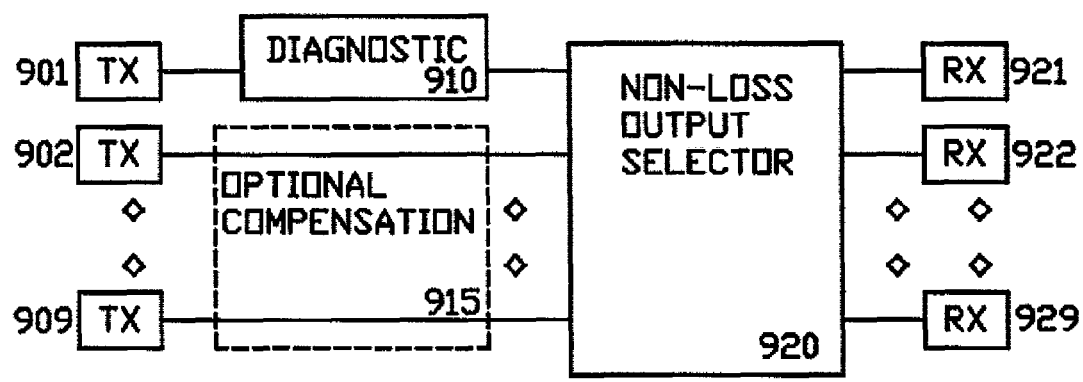
FIGS. 9a and 9b are block diagrams of two more embodiments of a test system of the invention that use non-loss selectors of FIGS. 7a to 7c and 8a to 8c and, optionally, a compensator.
Figure 9B:
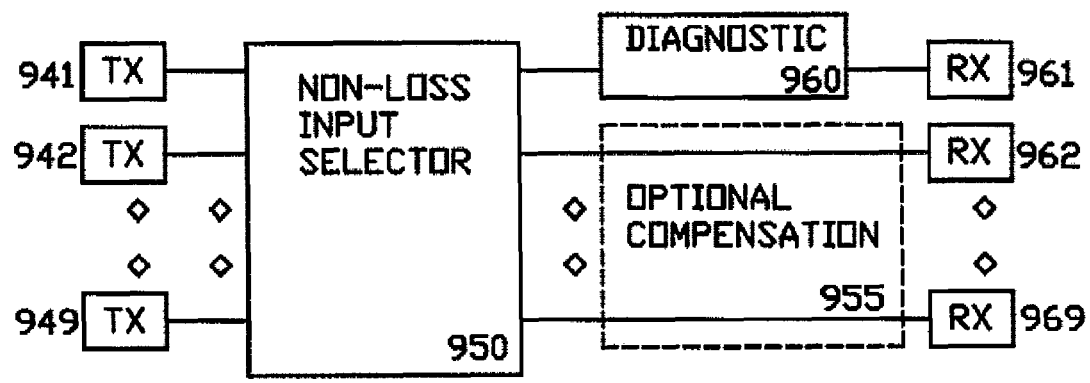

Referring to FIGS. 9a and 9b, two more embodiments of a testing system of the present invention are illustrated. These embodiments use a non-loss selector 920 and 950 and, optionally, a compensation module 915 or 955, respectively. FIG. 9a enables sharing one diagnostic apparatus 910 among N output links leading to N receivers 921 to 929. It is noteworthy for this embodiment in that it does not provide diagnostic sharing for all of N transmitters 901 to 909, but only the transmitter 901. Thus, all the receivers can be characterized, for example for sensitivity. The non-loss output selector 920 connects the testing apparatus 910 in turn to each of the receivers 921 to 929. However, the links are generally re-arranged, namely, there is no expectation that the transmitter 901 leads to the receiver 921, nor the transmitter 902 leads to the receiver 922, nor the transmitter 909 leads to the receiver 929. This rearrangement of the links is acceptable for the operation of some types of systems that might be diagnosed. The Draft Standards of IEEE 802.3ba describe the transport of high speed data by using many lanes, or links, each operating in parallel with the others. The high-speed data being transported is multiplexed between multiple transmitters passed though similar transmission media, and collected by multiple receivers. The data collected by the multiple receivers is then multiplexed back into the high-speed data. It is an interesting characteristic that each lane contains identification so that the multiplexing back into the high speed data can be done without regard to which lane comes from which receiver and without regard to which lane is associated with which transmitter.

There is a limit on the amount of "skew" between channels. Namely, it is normal for data to be delivered from a link with some delay from the time that the data enters the transmitter to the time it leaves the receiver of the link. The differences in delay from lane to lane or from link to link are described as "skew". Many systems that rely on parallel lanes to carry data can only function properly with the skew being limited. This skew limitation may require that the added delay introduced by the testing apparatus and its cabling be compensated in the other lanes. This is exactly the function of the optional compensation module 915 in the system being diagnosed. Typically, the compensation module 915 would be additional cable length to add delay to more closely match the delay produced in the testing apparatus 910. Alternatively or in addition, attenuators can be provided to attenuate the signals in the other paths to make the signal powers comparable for delivery to all of the receivers. The switching external to the testing apparatus 910 does not provide the loop-back capability mentioned above.

In contrast, certain other embodiments are not amenable to the introduction of optional compensation. For example, the switching system 601 of FIG. 6 does not have a provision for such an addition. The links that do not incorporate the tester are relatively shorter in that they go into one 2×2 switch and then proceed directly to their corresponding output. The extra cabling 99 and 101 cannot be readily compensated for because the delay of the input 99, the tester 150, and the output 101 is moved about from link to link as the switches are operated to test each link in turn.

Referring to FIG. 9b, an embodiment is shown where the tester apparatus 960 is shared among N transmitters 941 to 949, by using the non-loss input selector 950. Thus, the N transmitters 941 to 949 can be diagnosed for output power, jitter, and for other relevant operational parameters. As in FIG. 9a, the links may be re-arranged. This re-arrangement may or may not be a problem as discussed earlier in connection with FIG. 9a. Also, as discussed previously, there may be a need to more closely match the delays experienced in each link, and so it is to be noted that the optional compensation module 955 can be added.

Although the emphasis thus far was to use compensation for controlling delays, other parameters or a combination thereof might be controlled. For example, attenuation may be controlled. The switching external to the tester apparatus 960 does not provide a loop-back capability.

Figure 10:
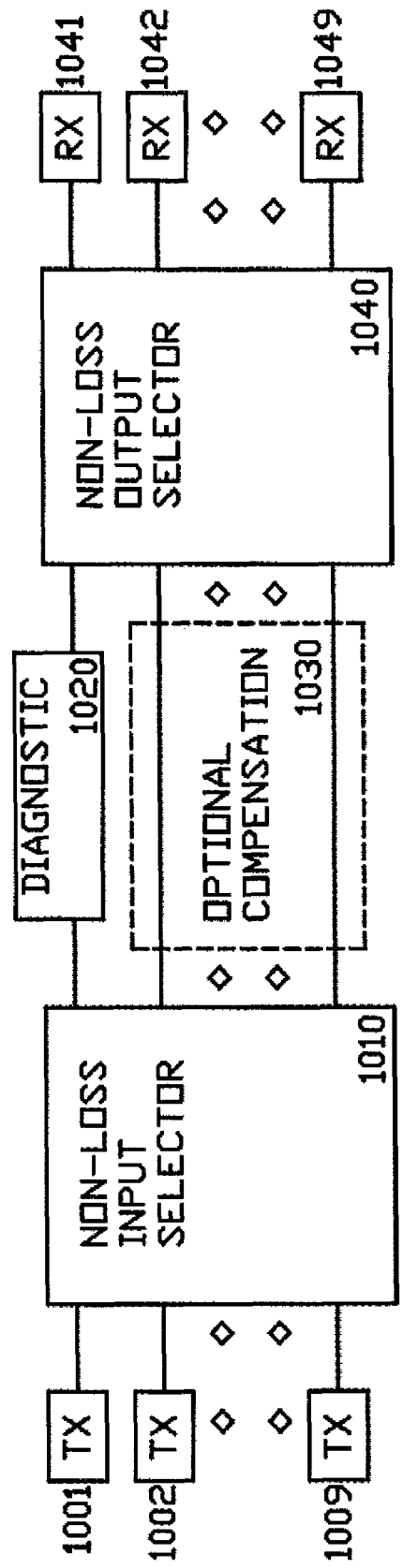
FIG. 10 is a block diagram of a test system for testing a link with arbitrary transmitter and receiver, with optional compensation of time delay and/or signal attenuation caused by the tester.

Turning to FIG. 10, an embodiment of a test system is shown that provides a full testing flexibility and supports optional compensation. One can avoid re-arrangement of the links by making the re-arrangements produced in a non-loss input selector 1010 be reversed or undone by a non-loss output selector 1040. The ability to remove re-arrangements is assured if the non-loss input selector 1010 and the non-loss output selector 1040 mirror each other in construction and settings. Another advantage of this embodiment is that a tester 1020 is shared over all of N transmitters 1001 to 1009, and over all of N receivers 1041 to 1049. Another advantage over the switching system 601 of FIG. 6 is that an optional compensation module 1030 can be introduced for signals passing between the non-loss input selector 1010 and the non-loss output selector 1040, but not passing through the tester apparatus 1020. The optional compensation module 1030 has been described earlier in connection with FIGS. 9a and 9b and can provide better matching or compensation for delay and/or attenuation, for example. In the embodiment shown, the switching external to the tester apparatus 1020 does not provide a loop-back capability. However, it can easily provide such a capability by providing an extra input for the non-loss input selector 1010, an extra output for the non-loss output selector 1040, and connecting the two together.

Figure 11:
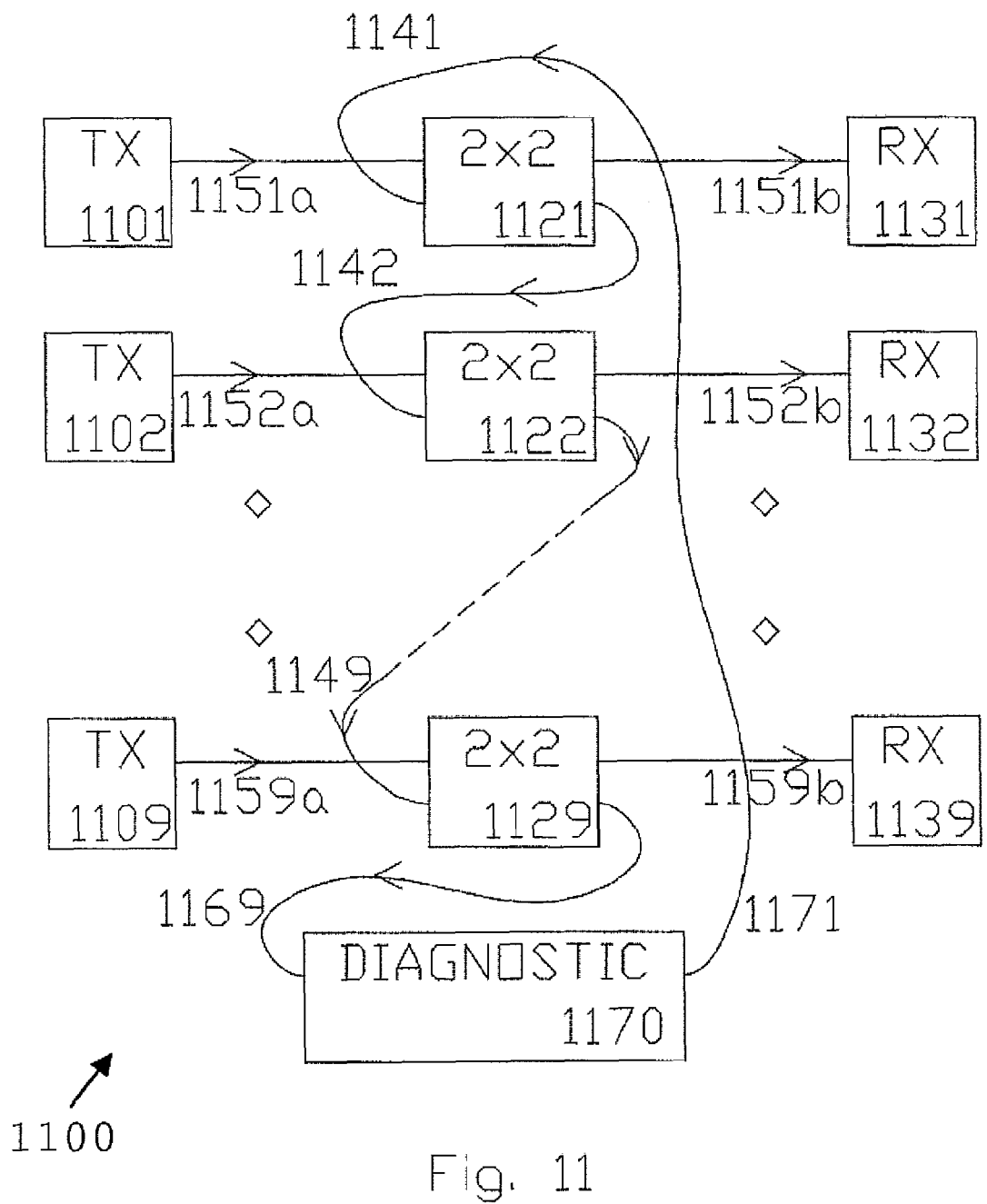
FIG. 11 is a block diagram of a test system having a daisy chain of 2×2 switches of FIGS. 4a to 4c.

Referring to FIG. 11, another embodiment of a switching system 1100 of the invention is presented. The switching system 1100 uses even fewer switches than the switching system 601 of FIG. 6. The switching system 1100 supports a plurality or N links with a plurality or N transmitters 1101 to 1109 having a plurality or respective N transmitter output segments 1151*a* to 1159*a* of a transmission medium, such as an electrical or optical cable, for example. The output segments 1151*a* to 1159*a* are coupled, through a plurality or N 2×2 switches 1121 to 1129, to a plurality or N receiver input segments 1151*b* to 1159*b* of the transmission medium. These are coupled to a corresponding plurality or N receivers 1131 to 1139, respectively. In general, the switching system 1100 includes a plurality or N 2×2 switches 1121 to 1129, each of the N transmitters being coupled to a unique one of the N receivers through a unique one of the N 2×2 switches 1121 to 1129. Herein, the term "coupled" includes a meaning "coupled through a corresponding transmission medium". The N 2×2 switches 1121 to 1129 are connected in a daisy chain having two ends, and a single tester 1170 is coupled to the ends of the daisy chain, e.g. an output of each switch 1121 to 1128 is connected to an input of the next switch 1122 to 1129 with connections 1142 to 1149. Thus, the tester 1170 is shared among the N links by connecting the N 2×2 switches 1121 to 1129, in series with N connections 1141 to 1149, an input 1169 to the tester 1170, and an output 1171 of the tester 1170, which is coupled to the connection 1141. The order of the series connection, ignoring the connection between the output 1171 to the input 1141, is from top of the page to the bottom of the page in FIG. 11, but it does not have to be in that order.

Nominally, each 2×2 switch 1121 to 1129 is in its "bar" state to provide the most direct connection between the corresponding transmitter 1101 to 1109 and receiver 1131 to 1139. To introduce the tester 1170 within the link starting at transmitter 1102 and ending in receiver 1132, the state of the corresponding switch 1122 changes from the "bar" state to the "cross" state. In the illustrated embodiment, the output segment 1152*a* of the transmitter 1102 is routed down the page through the lower succession of inputs and outputs of the 2×2 switches that have been connected in series and emerges from the lower output of the 2×2 switch 1129 at the input 1169 of the tester 1170. Similarly, the output 1171 of the tester 1170 is brought up to the top of the figure and enters as the original connection 1141, the lower input to the 2×2 switch 1121. The connection passes through the 2×2 switch 1121 and through the series connections, herein denoted at 1142, to arrive as the lower input to the switch 1122. Because the switch 1122 was set into its "cross" state to connect the transmitter output segment 1152*a* through a series of the 2×2 switches to the input 1169 of the tester apparatus 1170, the lower input to the 2×2 switch 1122, namely 1142, is routed to receiver input segment 1152*b* that leads to receiver 1132. To introduce the tester 1170 to a different link, the switch 1122 is restored to its "bar" state, and whatever switch is in the path of that different link is switched to the "cross" state.

This embodiment does provide loop-back for the tester apparatus 1170 through the whole loop of serial connections whenever no particular link is chosen for diagnostics.

As in all of the aforementioned parallel link embodiments, a deserializer device can be disposed at one end of the links for generating a plurality of lower data rate signals from a higher data rate signal, and a serializer can be disposed on the other end of the links for combining the plurality of lower data rate signals back into the higher data rate signal.

Figure 12:
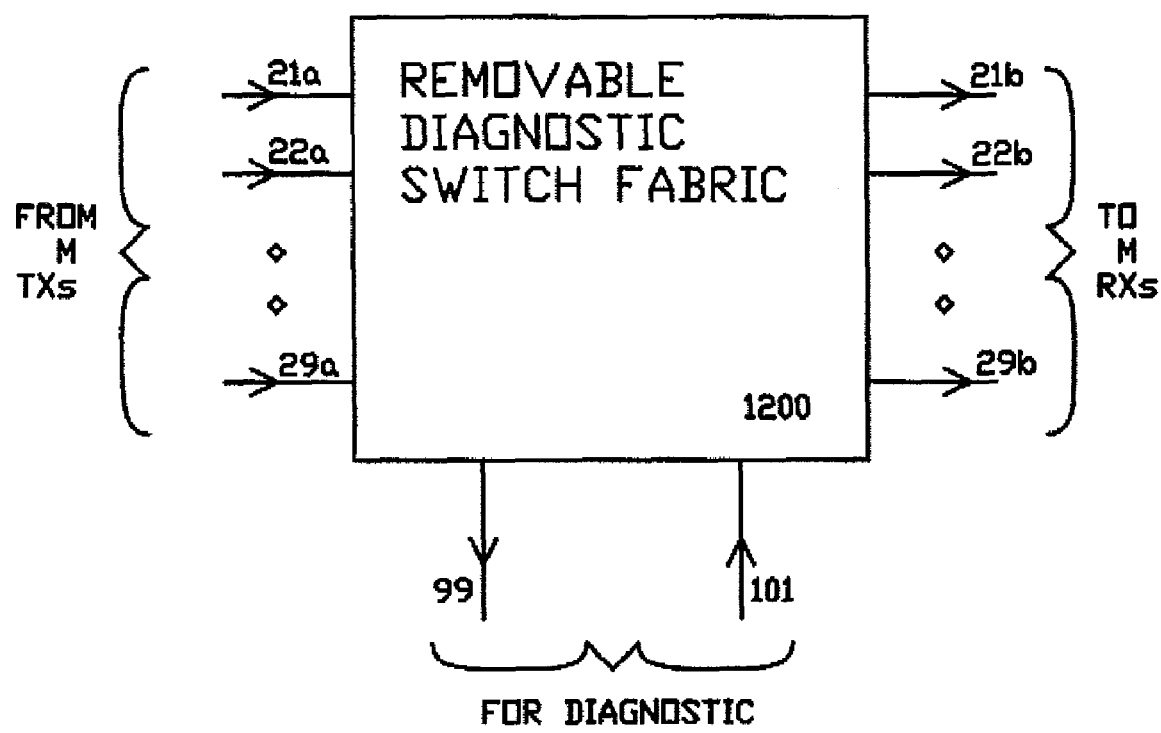
FIG. 12 is a block diagram of a removable diagnostic switch fabric (RDSF)

Turning to FIG. 12, a Removable Diagnostic Switch Fabric (RDSF) 1200 is illustrated. The RDSF 1200 has M inputs at 21*a* to 29*a* and M outputs at 21*b* to 29*b*, for supporting diagnostics of M links. In addition, the RDSF 1200 has an input 101 and an output 99 for connecting to a tester apparatus. In addition, the RDSF 1200 has a state in which the tester is not coupled into any of the plurality of links, so that the tester can be removed from the test system without impacting the functioning of the communication system.

If the RMSF 1200 can be configured so that it internally connects 101 to 99, then it is said to have a loop-back capability. In this case the RDSF 1200 can be labeled by the abbreviation: RMSF+LB. The switch fabric 301 of FIG. 3 can be an RDSF and, if it supports loop-back, it can be an RDSF+LB. Similarly, in FIG. 6, the collection of N 2×2 switches 201 to 209, the 1:N switch 102, and the N:1 switch 98 together with their interconnections form an RMSF+LB. Also, similarly, in FIG. 11 the N 2×2 switches 1121 to 1129 and their interconnections form an RMSF+LB.

Figure 13:
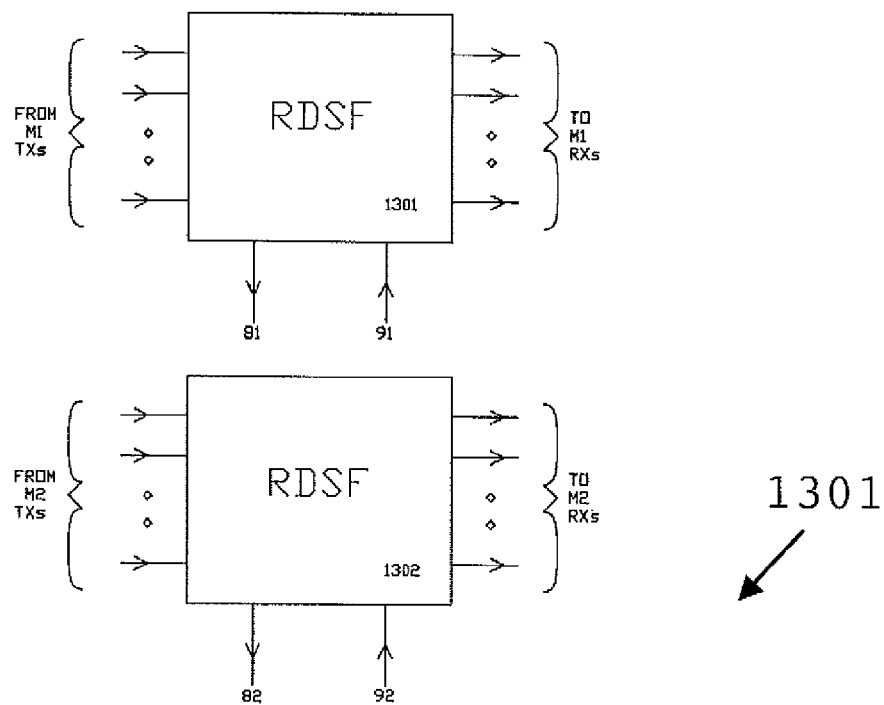
FIG. 13 is a block diagram of a test system having L RDSFs of FIG. 12, a 1:L switch, and an L:1 switch.
Figure 13:
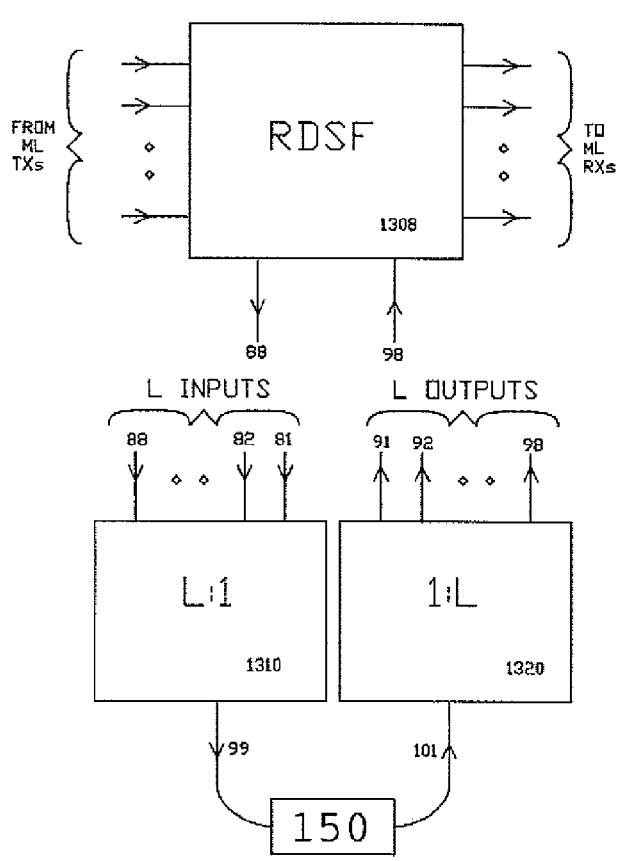

Referring to FIG. 13, yet another embodiment of a switching system 1301 of the invention is shown. In the switching system 1301, a plurality or L RDSFs 1301 to 1308 are coupled to an L:1 switch 1310, where like numbered lines 81 to 88 are connected. Also these same L RDSFs are coupled to a 1:L switch 1320 where like numbered lines 91 to 98 are connected. The total number of links is N, where N is the sum of the L values: $M_1$ to $M_L$, that is $$N = \sum_{l=1}^{L} M_l.$$

These N links are able to share the same tester apparatus 150. One might view the switch system of FIG. 13 as a generalization of the switching system 601 of FIG. 6.

The 1:L switch 1320 can be replaced by a 1:L coupler, or the L:1 switch 1310 can be replaced with a L:1 coupler. However, both 1:L and L:1 elements cannot be both couplers. When they are both couplers, multipath interference will result. In practice, point-to-point high-speed communications systems rarely use passive splitting and/or combining.

Figure 14:
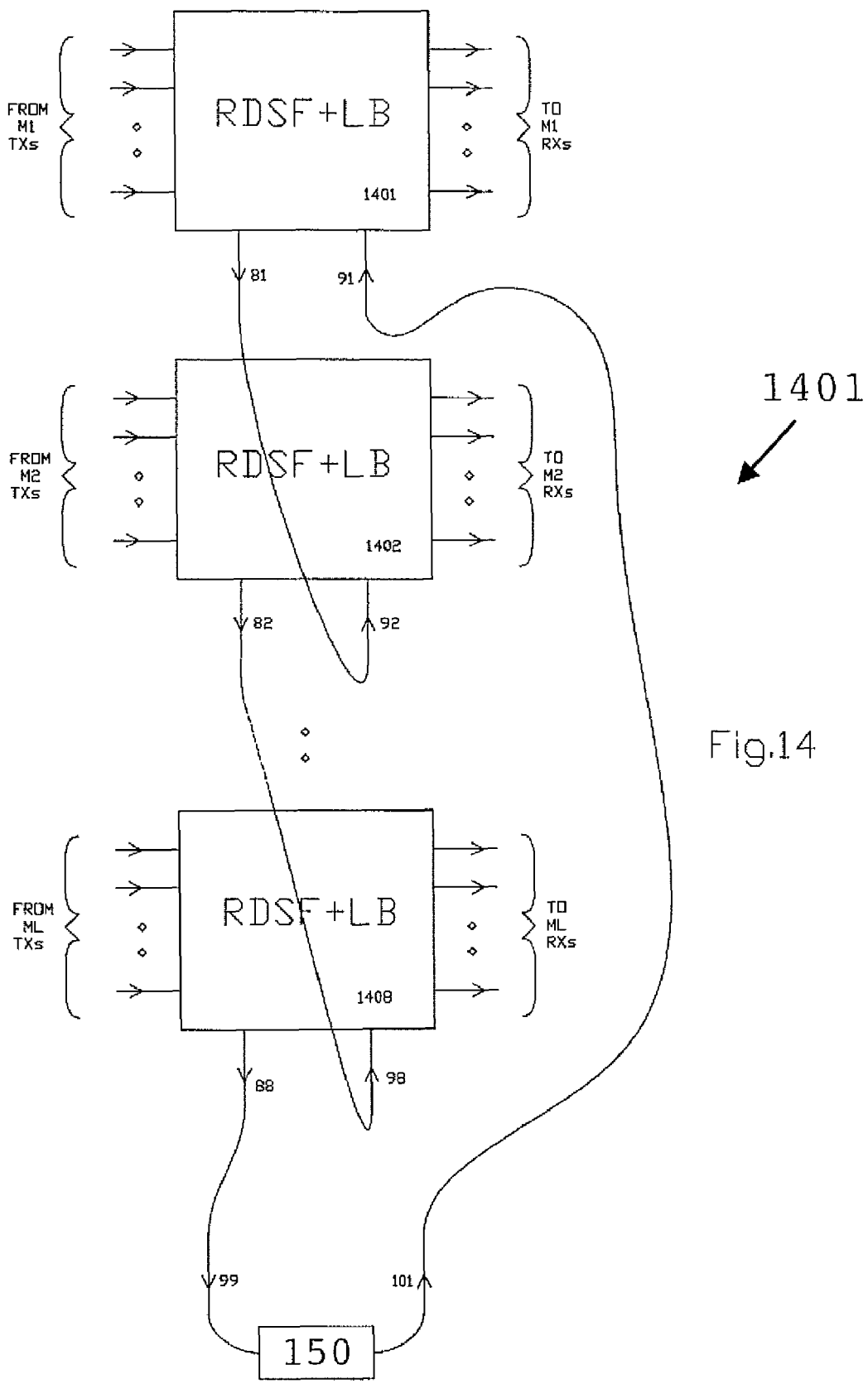
FIG. 14 is a block diagram of a test system having a daisy chain of RDSFs of FIG. 12.

Referring now to FIG. 14, an implementation of a switching system 1401 according to the invention is shown. The switching system 1401 uses several RDSF+LBs 1401 to 1408 without having to use an L:1 switch or a 1:L switch. The switching system 1401 is a generalization of the switching system 1100 of FIG. 11. Instead of using a 1:L switch and/or L:1 switch, the RDSF+LBs are coupled into a daisy chain, the ends of which are coupled to the tester 150. The series connections of the daisy chain comprise output 81 of RDSF 1401 to input 92 of RDSF 1402, output 82 to the next RDSF+LB and so on to the input 98 of RDSF+LB 1408, the output 88 of RDSF+LB 1408 to the input 99 of the tester 150, and, finally, the output 101 of the tester 150 to the input 91 of RDSF+LB 1401, thus completing the series loop.

Figure 15:
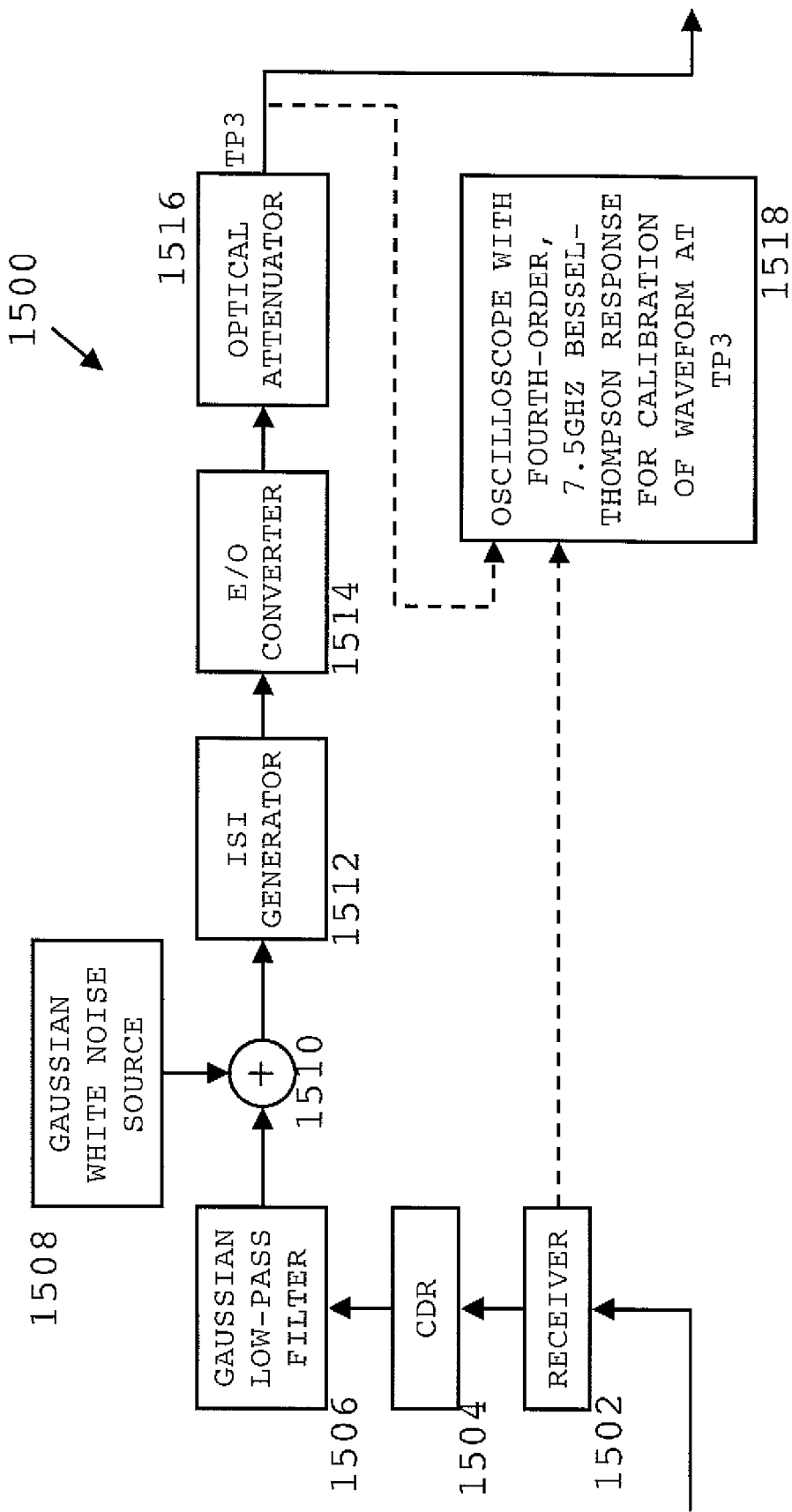
FIG. 15 is a block diagram of a tester of the present invention.

Turning now to FIG. 15, an embodiment 1500 of the tester 150 is shown in form of a block diagram. The tester 1500 is usable for troubleshooting, testing, and diagnostics of a digital fiberoptic link. The tester 1500 has a receiver 1502, a clock and data regenerator (CDR) 1504, a Gaussian low-pass filter 1506, a Gaussian white noise source 1508, an add unit 1510, an inter-symbol interference (ISI) generator 1512, an electric-to-optical (E/O) converter 1514, an optical attenuator 1516, and an oscilloscope 1518. In operation, the receiver 1502 receives an optical signal from a transmitter of an optical link to be tested. The signal is converted into an electrical form by the receiver 1502. The signal is regenerated, or digitized, by the CDR 1504. Then, the signal is filtered by the filter 1506. Then, a Gaussian white noise generated by the noise source 1508 is optionally added to the electrical signal by the add unit 1510, for testing purposes. The ISI generator 1512 adds an optional intersymbol interference, also for testing or diagnostic purposes. Then, the signal is converted back into the optical form by the E/O converter 1514 and attenuated by the attenuator 1516. By varying the amount of ISI and/or noise level, the optical link can be tested for sensitivity to these impairments, for example. The signal being outputted can be observed at the test point TP3 using the oscilloscope 1518.

The tester 1500 can also include the following optional features:

(a) a splitter for separating a portion of the signal and passing the remainder of the signal to an output of the tester 1500. The split off signal can be directed to a power meter, spectrum analyzer, or an oscilloscope for determining the power, frequency or wavelength, data rate, or a waveform of the signal being transmitted;

(b) the signal can be passed through an input attenuator and, optionally passed to the splitter (a); and (c) a digital regenerator having an ability to insert errors at random or predefined intervals into the signal. Of course, other test equipment can be used for "stressing" the output signal by introducing various other impairments, and/or for measuring parameters of the input signal.

Other embodiments of the tester 150 or the tester 1500 can be envisioned. For example, the tester 150 or 1500 can be configured to monitor and/or modify the content of a signal propagating therethrough. Furthermore, a test system of the present invention can be constructed for testing electric cable communication links, optical communication links, serial and parallel data links, multiplexed data links, and other communication and data link types. In general, the foregoing description of one or more embodiments of the invention has been presented for the purposes of illustration and description. For this reason, one is cautioned not to limit the invention to the disclosed embodiments, but rather encouraged to determine the scope of the invention only with reference to the following claims.

What is claimed is:

1. A test system for testing a communication system comprising a plurality of transmitters and receivers coupled in pairs forming a plurality of links, each of the plurality of links having a unique one of the plurality of transmitters coupled to a unique one of the plurality of receivers, the test system comprising:

a single tester having an input and an output, for independently testing any link of the plurality of links upon coupling the tester into one of the plurality of links by coupling the tester input to the link's transmitter and the tester output to the link's receiver;

a switching system for coupling the tester into any of the plurality of links such that all remaining links of the communication system have a unique one of the plurality of transmitters coupled to a unique one of the plurality of receivers; and a compensator for delaying and/or attenuating signals not passing through the tester, to compensate for a time delay and/or attenuation introduced by the tester.

2. The test system of claim 1, wherein the plurality of links comprises a plurality of parallel links.

3. The test system of claim 1, wherein the switching system has a state in which the input of the tester is coupled to the output thereof.

4. The test system of claim 1, wherein the switching system has a state in which the tester is not coupled into any of the plurality of links, wherein the tester can be removed from the test system without impacting the functioning of the communication system.

5. The test system of claim 1, wherein the switching system comprises a non-loss input selector for coupling any one of the plurality of transmitters to the tester.

6. The test system of claim, wherein the switching system comprises a non-loss output selector for coupling any one of the plurality of receivers to the tester.

7. The test system of claim 5, wherein the switching system comprises a non-loss output selector for coupling any one of the plurality of receivers to the tester.

8. The test system of claim 1, wherein the links are fiberoptic links.

9. The test system of claim 1, wherein the tester is configured to measure incoming signal power and/or to monitor and/or modify the content of a signal propagating therethrough.

10. The test system of claim 1, wherein the communication system is a digital transmission system, and wherein the tester is configured to introduce jitter and/or noise into a signal propagating therethrough.

11. The test system of claim 1, wherein the tester further comprises a receiver for receiving an incoming signal and a noise source for adding noise to the signal.

12. The test system of claim 1, wherein the tester further comprises an inter-symbol interference generator and/or jitter generator and/or attenuator, for adding the inter-symbol interference and/or jitter to a signal and/or for attenuating a signal, respectively.

13. A test system for testing a communication system comprising a plurality of transmitters and receivers coupled in pairs forming a plurality of links, each of the plurality of links having a unique one of the plurality of transmitters coupled to a unique one of the plurality of receivers, the test system comprising:

a single tester having an input and an output, for independently testing any link of the plurality of links upon coupling the tester into one of the plurality of links by coupling the tester input to the link's transmitter and the tester output to the link's receiver; and a switching system for coupling the tester into any of the plurality of links such that all remaining links of the communication system have a unique one of the plurality of transmitters coupled to a unique one of the plurality of receivers;

wherein the switching system has a state in which the input of the tester is coupled to the output thereof;

wherein the communication system comprises N links with N transmitters and N receivers, wherein N is an integer larger than one;

wherein the switching system comprises a barrel selector switch having N+1 inputs and N+1 outputs;

wherein the N transmitters are coupled to N of the N+1 inputs of the barrel selector switch, one transmitter per one input;

wherein the N receivers are coupled to N of the N+1 outputs of the barrel selector switch, one receiver per one output; and wherein the tester is coupled to the (N+1)th input and the (N+1)th output, whereby the tester can be coupled into to any one of the N links.

14. A test system for testing a communication system comprising a plurality of transmitters and receivers coupled in pairs forming a plurality of links, each of the plurality of links having a unique one of the plurality of transmitters coupled to a unique one of the plurality of receivers, the test system comprising:

a single tester having an input and an output, for independently testing any link of the plurality of links upon coupling the tester into one of the plurality of links by coupling the tester input to the link's transmitter and the tester output to the link's receiver; and a switching system for coupling the tester into any of the plurality of links such that all remaining links of the communication system have a unique one of the plurality of transmitters coupled to a unique one of the plurality of receivers, wherein the communication system comprises N links with N transmitters and N receivers, wherein N is an integer larger than one;

wherein the switching system includes N 2×2 switches, wherein each of the N transmitters is coupled to a unique one of the N receivers through a unique one of the N 2×2 switches;

wherein the N 2×2 switches are connected in a daisy chain having two ends; and wherein the tester is coupled to the ends of the daisy chain, whereby the tester can be coupled into any one of the N links.

15. A test system for testing a communication system comprising a plurality of transmitters and receivers coupled in pairs forming a plurality of links, each of the plurality of links having a unique one of the plurality of transmitters coupled to a unique one of the plurality of receivers, the test system comprising:

a single tester having an input and an output, for independently testing any link of the plurality of links upon coupling the tester into one of the plurality of links by coupling the tester input to the link's transmitter and the tester output to the link's receiver; and a switching system for coupling the tester into any of the plurality of links such that all remaining links of the communication system have a unique one of the plurality of transmitters coupled to a unique one of the plurality of receivers, wherein the communication system comprises N links with N transmitters and N receivers, wherein N is an integer larger than one;

wherein the switching system comprises N 2×2 switches, a 1:N element with one input and N outputs, and an N:1 element with N inputs and one output;

wherein each of the N transmitters is coupled to a unique one of the N receivers through a unique one of the N 2×2 switches;

wherein each of the N outputs of the 1:N element is coupled to a unique one of the N 2×2 switches;

wherein each of the N inputs of the N:1 element is coupled to a unique one of the N 2×2 switches; and wherein the tester is coupled to the input of the 1:N element and to the output of the N:1 element, whereby the tester can be coupled into any one of the N links.

16. The test system of claim 15, wherein at least one of the 1:N element and the N:1 element comprises a switch.

17. The test system of claim 15, wherein one of the 1:N element and the N:1 element comprises a coupler.

18. A test system for testing a communication system comprising a plurality of transmitters and receivers coupled in pairs forming a plurality of links, each of the plurality of links having a unique one of the plurality of transmitters coupled to a unique one of the plurality of receivers, the test system comprising:

a single tester having an input and an output, for independently testing any link of the plurality of links upon coupling the tester into one of the plurality of links by coupling the tester input to the link's transmitter and the tester output to the link's receiver; and a switching system for coupling the tester into any of the plurality of links such that all remaining links of the communication system have a unique one of the plurality of transmitters coupled to a unique one of the plurality of receivers;

wherein the switching system has a state in which the tester is not coupled into any of the plurality of links, wherein the tester can be removed from the test system without impacting the functioning of the communication system; and wherein the switching system comprises a removable diagnostic switch fabric (RDSF) element including:

a plurality of inputs, each input coupled to a unique one of the plurality of transmitters;

a plurality of outputs, each output coupled to a unique one of the plurality of receivers; and a diagnostic input and a diagnostic output, coupled to the output and the input of the tester, respectively, whereby the tester can be coupled into any one of the plurality of links.

19. The test system of claim 18, wherein the communication system comprises N links with N transmitters and N receivers, wherein N is an integer larger than one;

wherein the switch includes L RDSF elements, each RDSF element having $M_l$ inputs and $M_l$ outputs, wherein $$N = \sum_{l=1}^{L} M_l,$$

wherein L and $M_l$ are integers larger than one;

wherein each of the N transmitters is coupled to a particular input of a particular one of the L RDSF elements;

wherein each of the N receivers is coupled to a particular output of a particular one of the L RDSF elements;

wherein the L RDSF elements are connected into a daisy chain using their respective diagnostic inputs and outputs, the daisy chain having two ends; and wherein the tester is coupled to the ends of the daisy chain, whereby the tester can be coupled into any one of the N links.

20. The test system of claim 18, wherein the communication system comprises N links with N transmitters and N receivers, wherein N is an integer larger than one;

wherein the switch includes L RDSF elements, each RDSF element having $M_l$ inputs and $M_l$ outputs, wherein $$N = \sum_{l=1}^{L} M_l,$$

wherein L and $M_l$ are integers larger than one;

wherein each of the N transmitters is coupled to a particular input of a particular one of the L RDSF elements;

wherein each of the N receivers is coupled to a particular output of a particular one of the L RDSF elements;

wherein the diagnostic input of each of the L RDSF elements is coupled to a unique one of the L outputs of the 1:L element;

wherein the diagnostic output of each of the L RDSF elements is coupled to a unique one of the L inputs of the L:1 element; and wherein the tester is coupled to the input of the 1:L element and to the output of the L:1 element, whereby the tester can be coupled into any one any one of the N links.

21. The test system of claim 20, wherein at least one of the 1:L element and the L:1 element comprises a switch.

22. The test system of claim 20, wherein one of the 1:L element and the L:1 element comprises a coupler.

23. A test system for testing a communication system comprising a plurality of transmitters and receivers coupled in pairs forming a plurality of links, each of the plurality of links having a unique one of the plurality of transmitters coupled to a unique one of the plurality of receivers, a deserializer device for generating a plurality of lower data rate signals from a higher data rate signal, for propagating each one of the plurality of the lower data rate signals in a particular one of the plurality of links, and a serializer device for combining the plurality of lower data rate signals back into the higher data rate signal, the test system comprising:

a single tester having an input and an output, for independently testing any link of the plurality of links upon coupling the tester into one of the plurality of links by coupling the tester input to the link's transmitter and the tester output to the link's receiver; and a switching system for coupling the tester into any of the plurality of links such that all remaining links of the communication system have a unique one of the plurality of transmitters coupled to a unique one of the plurality of receivers;

wherein the tester is constructed to receive and transmit the lower data rate signals.

24. A method of testing a communication system, the method comprising (a) providing a test system for testing a communication system comprising a plurality of transmitters and receivers coupled in pairs forming a plurality of links, each of the plurality of links having a unique one of the plurality of transmitters coupled to a unique one of the plurality of receivers, a deserializer device for generating a plurality of lower data rate signals from a higher data rate signal, for propagating each one of the plurality of the lower data rate signals in a particular one of the plurality of links, and a serializer device for combining the plurality of lower data rate signals back into the higher data rate signal, the test system comprising:

a single tester having an input and an output, for independently testing any link of the plurality of links upon coupling the tester into one of the plurality of links by coupling the tester input to the link's transmitter and the tester output to the link's receiver; and a switching system for coupling the tester into any of the plurality of links such that all remaining links of the communication system have a unique one of the plurality of transmitters coupled to a unique one of the plurality of receivers, wherein the single tester is constructed to receive and transmit the lower data rate signals;

(b) coupling the single tester into a particular one of the plurality of links using the switching system; and (c) performing a test of the particular link using the single tester.

* * * * *